(12) United States Patent
Kim (10) Patent No.: US 11,514,148 B2
(45) Date of Patent: Nov. 29, 2022

(54) PASSWORD INPUT SYSTEM

(71) Applicant: Deok Woo Kim, Seoul (KR)

(72) Inventor: Deok Woo Kim, Seoul (KR)

( * ) Notice: Subject to any disclaimer, the term of this patent is extended or adjusted under 35 U.S.C. 154(b) by 162 days.

(21) Appl. No.: 16/628,345

(22) PCT Filed: Apr. 24, 2018

(86) PCT No.: PCT/KR2018/004757
§ 371 (c)(1),
(2) Date: Jan. 3, 2020

(87) PCT Pub. No.: WO2019/009509
PCT Pub. Date: Jan. 10, 2019

(65) Prior Publication Data
US 2020/0175147 A1   Jun. 4, 2020

(30) Foreign Application Priority Data

Jul. 4, 2017   (KR) .......................... 10-2017-0084824

(51) Int. Cl.
*G06F 21/34* (2013.01)
*H04L 9/08* (2006.01)

(52) U.S. Cl.
CPC ............ *G06F 21/34* (2013.01); *H04L 9/0863* (2013.01)

(58) Field of Classification Search
None
See application file for complete search history.

(56) References Cited

U.S. PATENT DOCUMENTS 6,828,899 B2   12/2004   Kim
D610,156 S  *   2/2010   Mudrick ................... D14/480.5
(Continued)

FOREIGN PATENT DOCUMENTS

JP   2003-99147 A    4/2003
JP   2007-304664 A   11/2007
(Continued)

OTHER PUBLICATIONS

International Search Report for PCT/KR2018/004757 dated Aug. 29, 2018 [PCT/ISA/210].
(Continued)

*Primary Examiner* — Benjamin E Lanier
(74) *Attorney, Agent, or Firm* — Sughrue Mion, PLLC (57) ABSTRACT

A password input system equipped with a security setting function is disclosed. The system includes one input unit configured to receive an input from user; an output unit configured to output a current state and result; a dedicated communication port configured to transmit and receive data to and from a password adaptor; a memory configured to save a program for security setting function; and a processor configured to execute the program saved in memory. When the processor waits for an input of a password from user and simultaneously password adaptor is coupled to dedicated communication port, the processor receives a password through communication with password adaptor and compares received password with a pre-saved password, and when the received password matches the pre-saved password, the processor unlocks a secure state without further inputting a password.

13 Claims, 5 Drawing Sheets

(56) References Cited

U.S. PATENT DOCUMENTS

| | | | | |
|---|---|---|---|---|
| 7,660,938 | B1* | 2/2010 | Chow | G06F 13/4045 710/313 |
| 10,025,729 | B2* | 7/2018 | Bolotin | G06F 12/1466 |
| 2005/0033968 | A1* | 2/2005 | Dupouy | G06F 21/34 713/183 |
| 2006/0184806 | A1* | 8/2006 | Luttmann | G06F 21/31 713/193 |
| 2006/0265340 | A1 | 11/2006 | Ziv et al. | |
| 2007/0101152 | A1* | 5/2007 | Mercredi | G06F 21/34 713/185 |
| 2007/0112981 | A1* | 5/2007 | Hernandez | H04L 63/083 710/62 |
| 2008/0288786 | A1* | 11/2008 | Fiske | G06F 21/46 713/190 |
| 2009/0216587 | A1* | 8/2009 | Dwivedi | H04L 67/18 705/7.12 |
| 2009/0319789 | A1* | 12/2009 | Wilson | H04L 9/3234 713/168 |
| 2010/0251358 | A1* | 9/2010 | Kobayashi | G06F 21/79 726/18 |
| 2011/0307708 | A1* | 12/2011 | Kritt | H04L 9/08 713/183 |
| 2011/0314296 | A1* | 12/2011 | Dolgunov | G06F 21/31 713/185 |
| 2012/0042377 | A1 | 2/2012 | Chen et al. | |
| 2012/0131336 | A1* | 5/2012 | Price | G06F 21/78 713/165 |
| 2014/0298489 | A1* | 10/2014 | Ashok | G06F 21/79 726/28 |
| 2014/0337920 | A1* | 11/2014 | Giobbi | G06F 21/44 726/3 |
| 2015/0269369 | A1* | 9/2015 | Hamid | G06F 9/4401 726/5 |
| 2016/0070313 | A1* | 3/2016 | Wu | G06K 19/07732 361/679.32 |
| 2016/0148597 | A1* | 5/2016 | Hamid | G06F 21/31 345/173 |
| 2016/0260098 | A1* | 9/2016 | Landrock | G06F 21/83 |
| 2017/0048257 | A1* | 2/2017 | Hamid | G06F 21/31 |
| 2019/0163893 | A1* | 5/2019 | Rodriguez Bravo | G06F 13/385 |

FOREIGN PATENT DOCUMENTS

| | | |
|---|---|---|
| JP | 2009-181316 A | 8/2009 |
| JP | 2011-70323 A | 4/2011 |
| JP | 2012-27708 A | 2/2012 |
| JP | 2013-20304 A | 1/2013 |
| KR | 10-2002-0030582 A | 4/2002 |
| KR | 10-2003-0021938 A | 3/2003 |
| KR | 10-2011-0078601 A | 7/2011 |
| KR | 10-2014-0144605 A | 12/2014 |
| KR | 10-1479165 B1 | 1/2015 |
| WO | 2016017996 A1 | 2/2016 |

OTHER PUBLICATIONS

Written Opinion for PCT/KR2018/004757 dated Aug. 29, 2018 [PCT/ISA/237].

Jian Huang et al., "FlashGuard: Leveraging Intrinsic Flash Properties to Defend Against Encryption Ransomware", ACM SIGSAC Conference on Computerand Communications Security, Oct. 2019, pp. 2231-2244 (14 pages total).

* cited by examiner

PASSWORD INPUT SYSTEM

CROSS-REFERENCE TO RELATED APPLICATIONS

This application is a National Phase Application of PCT International Application No. PCT/KR2018/004757, which was filed on Apr. 24, 2018, and which claims priority from Korean Patent Application No. 10-2017-0084824 filed with the Korean Intellectual Property Office on Jul. 4, 2017. The disclosures of the above patent applications are incorporated herein by reference in their entirety.

BACKGROUND

1. Technical Field

The present invention relates to a system for inputting a password.

2. Description of the Related Art

A portable auxiliary storage device, such as USB memory device or external hard drive, is easy in mobility and convenient in portability and is generally used with USB.

Such a portable auxiliary storage device uses a user ID and a password for user authentication; however, such user authentication has a possibility that a security function is completely disabled if a user ID and a password are leaked.

In order to solve such a problem, various USB security programs have been developed, but the conventional security programs have limitation where a relevant program should necessarily and previously be installed in a computer to be used.

In order to overcome the limitation, a variety of methods are used: For example, Bluetooth function is added to an auxiliary storage device so that a password can be input to an application of a portable phone. For another example, a method of authenticating a user by using biometrics is used. Although such methods have an advantage of enhancing the security of user authentication, the manufacturing cost increases much and therefore they are being dismissed from the market.

In this context, Korean Patent Publication No. 10-2011-0078601 (Invention Title: "USB security device having a safe password input/output function, and an authentication method") discloses a technology for safe password inputting, where an input unit for input of a password and an output unit for checking the input password are embedded in a USB security device.

Since the above-described invention always requires password input in any case, a portable auxiliary storage device equipped with the above-described invention can be available only after the portable auxiliary storage is coupled to a target device and powered to input a password. Therefore, there is a problem that the password must be always input even in a safe environment where only an authentic user uses the device.

SUMMARY OF THE INVENTION

The present invention provides a password input system, in which a connection between a password adaptor and the password input system can be setup when a user attaches the password adaptor to the above-cited invention, such that a security state can be unlocked without user's password input.

The present invention also provides a password input system, in which a password for security can be input and set on the basis of information about the number of user inputs received through one input unit, information about an input time, information about a time interval between the inputs, and information about an input waiting time.

Moreover, by using only one input unit as an input device, the present invention may be easily equipped in a small-sized device. Thus, it does not need additional software and minimizes the cost, thereby enabling the present invention to be easily and actually utilized.

The objects of the present invention are not limited to the aforesaid, but other objects not described herein will be clearly understood by those skilled in the art from descriptions below.

As a technical means for achieving the technical solution, a password input system equipped with a security setting function according to the present invention includes one input unit configured to receive an input of a user, an output unit configured to output a current state and a result, a dedicated communication port configured to transmit and receive data to and from a password adaptor, a memory configured to save a program for the security setting function, and a processor configured to execute the program saved in the memory, wherein, as the processor executes the program, when the processor stands by for an input of a password from the user and simultaneously the password adaptor is coupled to the dedicated communication port, the processor receives a password through communication with the password adaptor and compares the received password with a pre-saved password, and when the received password matches the pre-saved password, the processor unlocks a secure state without a password being input from the user.

When information about the password received from the password adaptor does not match the pre-saved password, the processor may accumulate number of mismatches and saves the accumulated number of mismatches in the memory; and when the accumulated number of mismatches is greater than a predetermined number, the processor may perform a state change so that the secure state is unlocked based on only an input received through the input unit.

In a state where the state change is performed so that the secure state is unlocked based on only the input received through the input unit, when the secure state is unlocked based on a password input by the user, the processor may initialize the accumulated number of mismatches.

The password adaptor may include a plurality of serially connected shift registers, may set a value of the password to an input value of each of the plurality of serially connected shift registers, and may transfer a value, output based on a shift clock signal applied thereto, through the dedicated communication port.

The password input system may further include an input register configured to receive and read the output value and an output register configured to generate the shift clock signal and a load signal for inputting the input value to the shift register.

When all values received through the dedicated communication port are 0 or 1, the processor may determine that a connection to the password adaptor is not set.

As the processor executes the program, when an input of a password is received through the input unit from the user, the processor may compare the input password with the pre-saved password, and when the input password matches the pre-saved password, the processor may unlock the secure state. The input of the password may include one or more of information about number of inputs received through the input unit, information about an input time, information about a time interval between inputs, and information about an input waiting time.

As a connection to a user device is set, the output unit may output an event notifying the user of a password input request.

The processor may initialize an input table and an event calculation counter saved in the memory, may increase an event calculation counter on the basis of number of inputs received through the input unit from the user, and may record a time interval between successive inputs in the input table by using the event calculation counter as a pointer. As the input waiting time elapses, the processor determines that the input of a password is completed. The processor may select the time interval information saved in the input table from largest where the number of selected time interval information is one less than the number of digits of a password. The processor uses the selected time interval as the separation point of each digit of the password, and may divide the event calculation counter into multiple sections on the basis of the separation points. The processor summates the number of inputs in each section of the event calculation counter divided by the separation points, thereby sequentially recognizing the sum as an input of each digit of the password.

The processor may initialize an event calculation counter and a digit counter of a password, and when the input for increasing the event calculation counter is received through the input unit from the user within the predetermined time TV1 (Time Value No. 1), the processor may increase the event calculation counter to correspond to the input. When an input for increasing the event calculation counter is received again within the predetermined time TV1 after predetermined time TV2 (Time Value No. 2) elapses, the processor may increase the event calculation counter to correspond to the input and may increase the digit counter together. As the input is completed, the processor may compare the pre-saved password with a password input based on the event calculation counter corresponding to each digit counter of the password to determine whether they are the same.

The input for increasing an event calculation counter may be the number of inputs received through the input unit within time TV1.

In the case where it is determined that an error occurs continuously in the password input predetermined times, the processor may unlock the secure state only when the authentication of a master password succeeds.

The output unit may output, by using different display methods, the connection state, the value of TV1, the values of TV2, the available state, and when an error occurs in the password input a plurality of times.

The processor may initialize an event calculation counter and a digit counter of a password, and when the input for increasing an event calculation counter is received through the input unit from the user within a predetermined time TV1, the processor may increase the event calculation counter and, initializes a timer, and waits for the input for increasing an event calculation counter within the next 1 time TV1. When the time TV1 elapses, the processor may increase the digit counter and may recognize the event calculation counter, increased until before time TV1 elapses, as the input of corresponding digit in the password before the digit counter increases, and as the input is completed, the processor may compare the pre-saved password with the inputted password based on the event calculation counter corresponding to each digit counter of the password to determine whether they are the same.

When the input for starting to set a password is received through the input unit from the user, the processor may replace the pre-saved password with the inputted password, based on the same method as receiving the password input.

The output unit may include a display for outputting one or more letters or images. The display may display a letter or an image corresponding to number of inputs received through the input unit, and when the input for designating the above letter or image as the first digit of a password is received from the user, the processor may output, through the display, a letter or an image for designating the second digit of the password. As the input is completed, the processor may compare the pre-saved password with the letter or the image corresponding to each digit of the designated password to determine whether they are the same.

The output unit may include a display for outputting one or more letters or images. The display may continuously output letters or images corresponding to a predetermined order, and when an input for designating a currently outputted letter or image as the first digit of a password is received from the user, the processor may designate the currently outputted letter or image as the first digit of a password, and then, may continuously output the letters or the images in the predetermined order and waits for receiving the input which designates the second digit of the password. As the input is completed, the processor may compare the pre-saved password with the letter or the image corresponding to each digit of the designated password to determine whether they are the same.

The processor may output each digit of the designated password as a blind letter on the display, may output the first digit as the letter or the image while waiting for the input designating the first digit from the user, and may output other digits as blind letters except the first digit.

The password input system of the present invention may be used for a portable auxiliary storage device or a door lock apparatus. In case that the password input system is applied to a portable auxiliary storage device, it is preferable that the processor is coupled to a dedicated chip which processes a communication protocol such as a USB, and a flash memory is added thereto. In a case where the password input system is applied to a door lock, it is preferable that the password input system is implemented as a type which provides a signal to an electric circuit unit driving the locking apparatus of a door lock.

DETAILED DESCRIPTION OF THE INVENTION

Hereinafter, embodiments of the present invention will be described in detail to be easily embodied by those skilled in the art with reference to the accompanying drawings. The present invention may, however, be embodied in many different forms and should not be construed as being limited to the embodiments set forth herein. The present invention may, however, be embodied in many different forms and should not be construed as being limited to the embodiments set forth herein. In the accompanying drawings, a portion irrelevant to a description of the present invention will be omitted for clarity. Like reference numerals refer to like elements throughout.

In this disclosure below, when it is described that one comprises (or includes or has) some elements, it should be understood that it may comprise (or include or have) only those elements, or it may comprise (or include or have) other elements as well as those elements if there is no specific limitation.

Figure 1:
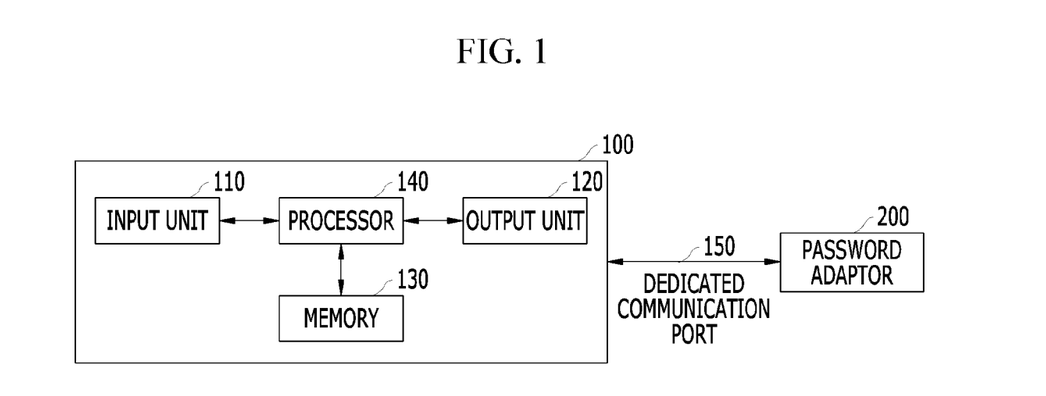
FIG. 1 is the block diagram of a password input system according to an embodiment of the present invention.

FIG. 1 is a block diagram of a password input system 100 according to an embodiment of the present invention. FIGS. 2A to 2D are diagrams for describing an embodiment of a password adaptor 200.

An embodiment of the present invention relates to a password input system 100 in which a password may be input to and set in an application device on the basis of information about the number of user inputs received through one input unit, information about an input time, information about a time interval between inputs, and information about an input waiting time.

In this case, an embodiment of the present invention is characterized in that a password adaptor 200 can be coupled and detached to and from the password input system 100. When the password adaptor 200 is coupled to the password input system 100 and thereby a connection between the password adaptor 200 and the password input system 100 is set, a user may unlock the secure state even without inputting a password.

Moreover, the password input system 100 according to the embodiment of the present invention may be applied to various products such as a smart device or a lock system of door and car, in addition to a portable auxiliary storage device such as a USB.

Therefore, the password input system according to the embodiment of the present invention may cooperate with system components such as an internal processor and a memory of a portable auxiliary storage device and elements for transmitting and receiving data. Also, the password input system may cooperate with elements such as an internal processor, a memory, and a data communication module of a door lock and a lock system or the driver unit of a lock system.

In the embodiment of the present invention, only one password may be set in the password input system 100; in the case of portable auxiliary storage devices or the like, a plurality of passwords may be set per each file or folder, and so a password input may be requested in accordance with respective attempts to access.

The password input system 100 according to an embodiment of the present invention may have a master password which is previously set in a factory in addition to a password set by a user. Using the master password, if the user forgets his/her set password, the password initialization or security unlock can be achieved.

The password input system 100 according to an embodiment of the present invention, as in FIG. 1, may include an input unit 110, an output unit 120, a memory 130, a processor 140, and a dedicated communication port 150.

The input unit 110 receives a user input for inputting or setting a password. The input unit 110 may be a touch type such as a button type, a pressure type, or a capacitive type and is not specially limited here. Hereafter, however, the input unit 110 will be described as a button type Moreover, the input unit 110 is characterized in that it is provided as one input unit for the low cost and the easiness of application to various equipments.

The output unit 120 outputs a result of a user input or a current state. In this case, the output unit 120 may be configured with one or more LEDs to display various colors (e.g., red, green, orange, or white) through one LED or multiple LEDs. Also, as described below, the output unit 120 may have an extra display such as an LCD in addition to an LED. The LCD may be employed thereto either along with the LED or instead of the LED.

A program for executing a security setting function according to the present invention is saved in the memory 130. The memory 130 may be implemented as, for example, a portable type such as NAND flash memory (e.g., compact flash (CF) card, secure digital (SD) card, solid-state drive (SSD), micro SD card, etc.), magnetic computer storage device (e.g., hard disk drive (HDD)), or optical disc drive (e.g., CD-ROM and DVD-ROM) and is not specially limited thereto as long as it can be implemented as portable type.

The processor 140 may execute the program saved in the memory 130. Specifically, in a portable auxiliary storage device, the processor 140 may execute the program saved in the memory 130 when a connection with a user device is set.

In this case, the user device is a wireless communication device where portability and mobility are ensured like smartphones and tablet PCs in addition to desktop and laptop computers, and may include all types of devices where a connection to the password input system 100 is set and reading/writing of saved data is controlled.

The dedicated communication port 150 transmits and receives data to and from the password adaptor 200. The dedicated communication port 150 may be implemented as various types. The dedicated communication port 150 may be simply implemented without a processor or a program by using a shift register, or may be implemented with a processor.

Figure 2A:
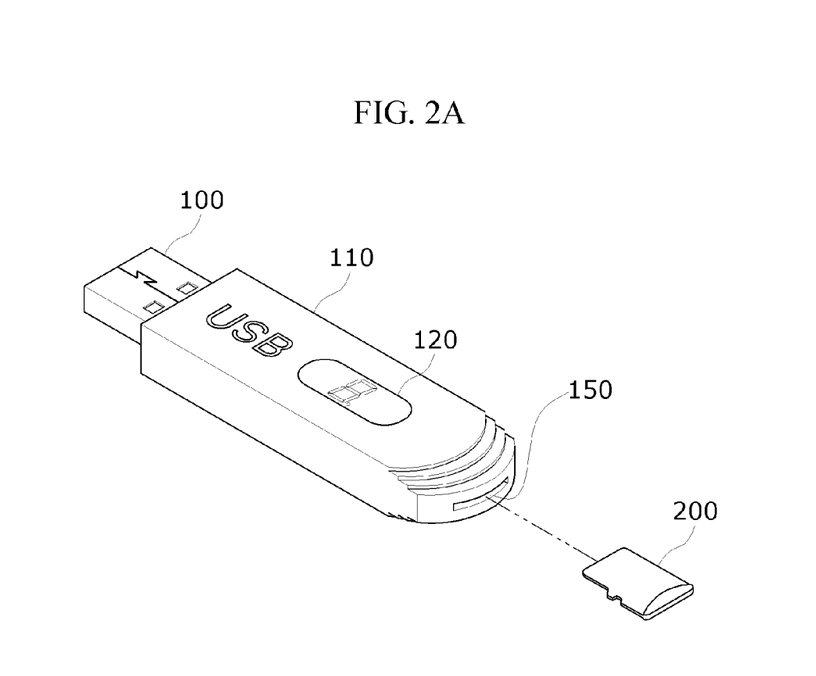
FIGS. 2A to 2D are diagrams for describing an embodiment of a password adaptor.

If there is no processor, for example as in FIG. 2A, the dedicated communication port 150 may be placed the rear side of a USB security device and may be coupled easily to the password adaptor 200.

Figure 2B:
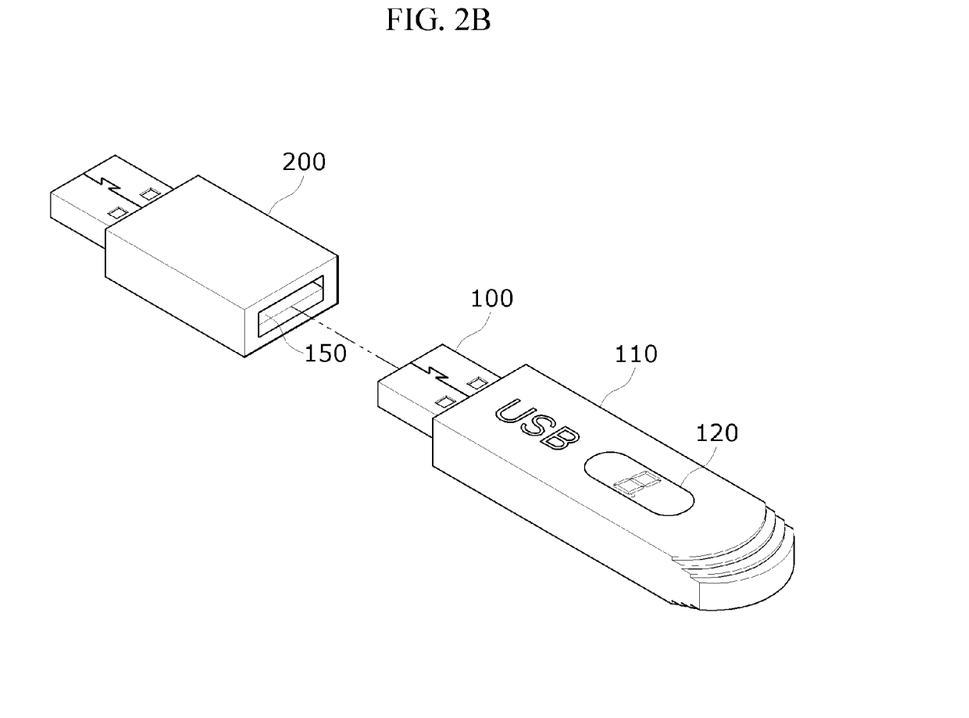

If there is a processor, the dedicated communication port 150 may be implemented as, for example, a type including a USB port as in FIG. 2B. In this case, the information about a password may be transmitted through a standard USB communication, wherein the password adaptor 200 has two USB ports and one is coupled to a host and another is coupled to a portable auxiliary storage device (which has the password input system 100 according to the present invention). Therefore, the password adaptor 200 performs a function of the host on the portable auxiliary storage device which has the password input system 100 according to the present invention.

Moreover, the dedicated communication port 150 may be implemented as a radio frequency identification (RFID) reader unit, and in this case, the password adaptor 200 may be implemented as an RFID tag and may communicate with the dedicated communication port 150. When the dedicated communication port 150 and the password adaptor 200 are respectively implemented as the RFID reader unit and the RFID tag, the present invention may be easily applied to a door lock for entrance or vehicles.

In detail, when power is applied to the password input system 100, the password input system 100 may maintain a password input waiting state, and at this time, when a connection to the password adaptor 200 is set, the password input system 100 may transmit and receive data to and from the password adaptor 200 through the dedicated communication port 150.

The processor 140 may request information about a password from the password adaptor 200 through the dedicated communication port 150 to receive the password and may compare the received password with a pre-saved password. When they are the same, secure state is unlocked without inputting a password.

In this case, the password which is received from the password adaptor 200 and compared may be the same as the password set by the user or the master password.

In order to prevent a continuous attempt to unlock the secure state through another password adaptor 200, when the password received from the password adaptor 200 is not the same as the pre-saved password, the processor 140 may accumulate and save the number of erroneous trials in the memory 130. Also, when the accumulated number of erroneous trials is greater than a predetermined number, the password input system 100 may change its state to prevent the secure state from being unlocked through the password adaptor 200 and to allow the secure state to be unlocked through only an input from the input unit 110.

At this time, in the embodiment of the present invention, the output unit 120 may display that another password adaptor 200 is connected to, display the accumulated number of erroneous trials, or display that it is possible to unlock a security setting through only the input unit 110.

Moreover, in the embodiment of the present invention, in a state where the secure state can be unlocked only by the input from the input unit 110, when the secure state is unlocked by the password input through the input unit 110, the processor 140 may initialize the accumulated number of erroneous trials.

The password adaptor 200 may be a device implemented with a memory (not shown) and a processor (not shown), or may be implemented as a simple type without memory and processor.

Figure 2C:
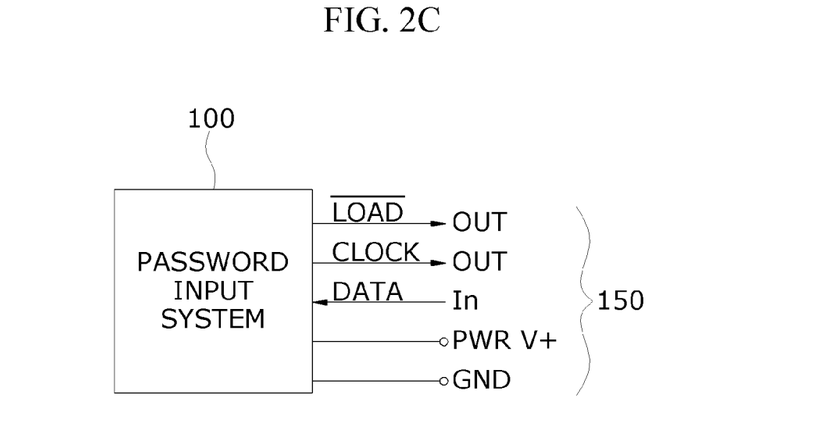
Figure 2D:
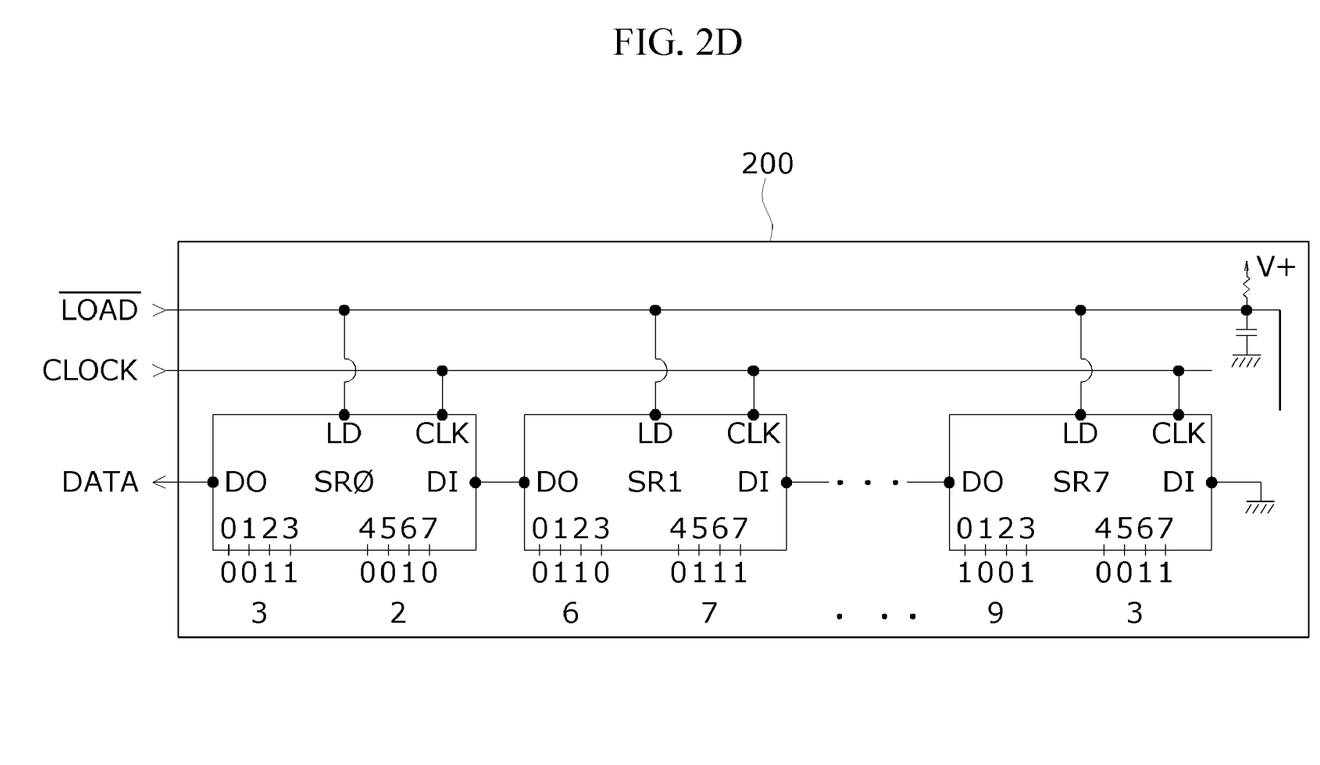

For example, as in FIGS. 2C and 2D, the password adaptor 200 may be configured to include a plurality of serially connected shift registers. In this case, FIG. 2C illustrates a signal configuration of the dedicated communication port 150, and FIG. 2D illustrates the detailed configuration of the password adaptor 200.

In this case, the password adaptor 200 sets a value of a password to be inputted values of the plurality of serially connected shift registers and transfers a value, which is outputted by one bit each time as a shift clock signal is applied, through the dedicated communication port 150.

For example, when supposing a password is sixteen-digit number "3267 9141 7167 8793", this may be expressed in 4 bits. Thus, as in FIG. 2D, eight 8-bit shift registers SR0, SR1, . . . , SR7 may be connected to one another in series. Here, the first shift register SR0 has "32" as an input value, the second shift register SR1 has "67" as an input value, and the last shift register SR7 has "93" as an input value.

A load signal LOAD is applied to serially connected shift registers and 64 shift clock signals CLOCK are applied, whereby read operation is performed by one bit each time.

Therefore, an output value DATA may be transferred through the dedicated communication port 150, and the processor 140 may check whether it is the same as the pre-saved password, and thus, may determine whether to unlock the secure state.

When seen from the processor 140, the dedicated communication port 150 may have five wires such as LOAD (Out), CLOCK(Out), DATA(In), POWER(V+), and GND as in FIG. 2C; when seen from the password adapter 200, the dedicated communication port 150 may have five wires such as LOAD(In), CLOCK(In), DATA(Out), POWER(V+), and GND as in FIG. 2D. Furthermore, the password input system 100 according to the embodiment of the present invention may further include an input register and an output register.

The output register may be configured by, for example, two bits and may generate a load signal and a shift clock signal for inputting an input value to the shift register. The input register may be configured by one bit and may receive and read an output value.

In the meantime, when all values received from the password adaptor 200 through the dedicated communication port 150 are '0' or '1', the processor may determine that a connection to the password adaptor 200 is not set.

As described above, in the embodiment of the present invention, since the above-described password adaptor 200 is used by attaching it to the password input system 100, there arises an advantage of minimizing the inconvenience of use where the secure state is unlocked by inputting a password each time.

Hereinafter, in the password input system 100 according to the embodiment of the present invention, the case where the output unit 120 does not include a display and another case including a display will be explained separately.

First, a case where the output unit 120 of the password input system 100 does not include a display (i.e., a case configured with one or more pieces of discrete LED) will be explained.

When the processor 140 of the password input system 100 executes a program, the output unit 120 outputs an event notifying a password input request. For example, the output unit 120 always emits light of a first color (e.g., green) on the basis of control by the processor 140 or in a default manner.

When a connection is set in this manner, the user inputs a password through the input unit 110, and the processor 140 which received the input password compares the input password with a pre-saved password on the basis of one or more of information about the number of inputs, information about an input time, information about a time interval between inputs, and information about an input waiting time and then determines whether they are the same. When they are the same, the set security is unlocked.

Like the foregoing, according to the embodiment of the present invention, in addition to information about the number of inputs from the user, information about input time related to a time range where an input should be performed is considered as an input of a password, and moreover, information about input waiting time which is recognized as an input when a next input is received after a certain waiting time after an input is considered as an input of a password. Thus, a simple configuration such as a simple button type or touch type of the related art can be applied and enhanced security is expected.

Figure 3:
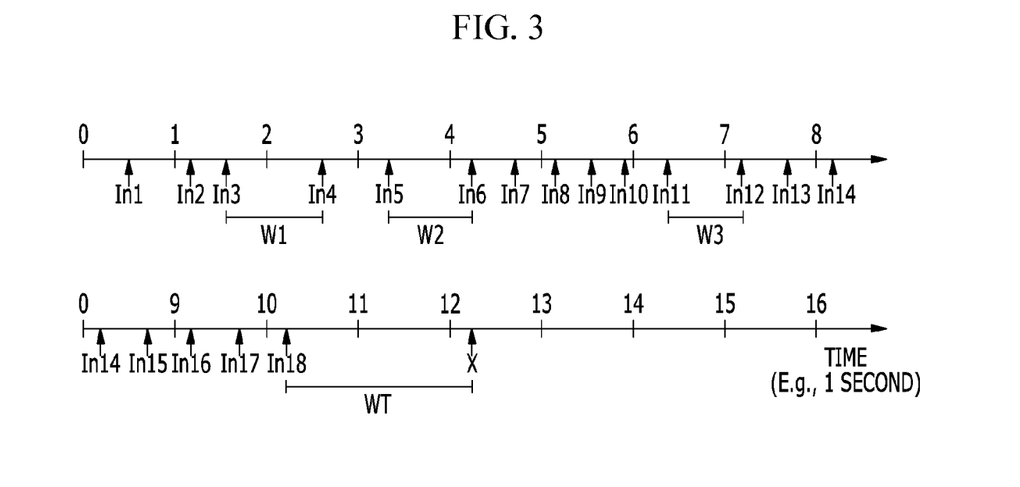
FIG. 3 is the exemplary diagram for describing a password input method according to an embodiment of the present invention.
Figure 4:
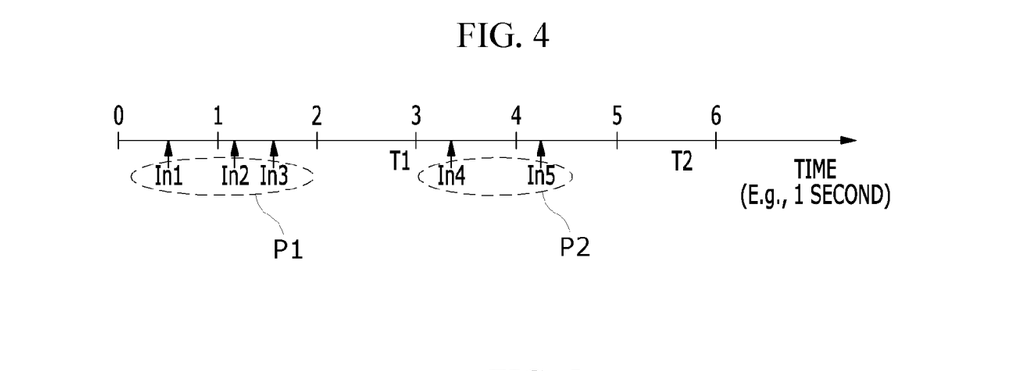
FIG. 4 is the exemplary diagram for describing a password input method according to another embodiment of the present invention.

FIG. 3 is an example diagram for describing a password input method according to an embodiment of the present invention. FIG. 4 is an example diagram for describing a password input method according to another embodiment of the present invention.

In an embodiment of the present invention, the value of an input table and an event calculation counter are saved in the memory 130. In this case, the event calculation counter counts the number of inputs from the input unit 110, and information about a time interval between inputs is recorded in the input table.

The processor 140, automatically after being connected to a user device, or after recognizing that a password starts to be inputted through the input unit 110 from the user, initializes the input table and the event calculation counter saved in the memory 130 and outputs an event notifying that an input is possible from the output unit 120.

The processor 140 increases the event calculation counter by one whenever an input is received through the input unit 110 from the user and records information about a time interval between two successive inputs in the input table by using the event calculation counter as a pointer.

Moreover, when an input waiting time elapses, the processor 140 determines that an input of a password is completed, and compares the password with a pre-saved password to determine whether they are the same.

In this case, the processor 140 may select the time interval information saved in the input table from largest where the number of selected time interval information is one less than the number of digits of the password. The processor uses the selected time intervals as the separation points of each digit of the password, and may divide the event calculation counter into multiple sections on the basis of the separation points. The processor summates the number of inputs in each section of the event calculation counter separated based on the separation points, thereby sequentially recognizing the sum as an input of each digit of the password.

Referring to the illustration of FIG. 3, when a pre-saved password is '3267', the user continuously presses (I1-I3) a button three times as an input of a password and stands by for a short time (W1), continuously presses (I4-I5) the button twice subsequently and stands by for a short time (W2), continuously presses (I6-I11) the button six times subsequently and stands by for a short time (W3), and continuously presses (I12-I18) the button seven times subsequently and stands by for an input waiting time (WT).

As an input is received through the input unit 110 total eighteen times, the processor 140 increases the event calculation counter by eighteen times (I1-I18) and sets the event calculation counter as a pointer (a time interval between I1 and I2, a time interval between I2 and I3, . . . , a time interval between I17 and I18) to record these time interval information (total seventeen) between inputs corresponding to total eighteen inputs in the input table.

Subsequently, after extracting 'W1', 'W2', and 'W3' among the time interval information saved in the input table from largest because the password is a four-digit number. the processor 140 sets 'W1', 'W2', and 'W3' as separation points of respective digits of the password.

Moreover, the processor 140 divides the event calculation counter with respect to the separation points 'W1', 'W2', and 'W3', and thus, the event calculation counter is divided into section 'I1-I3', section 'I4-I5', section 'I6-I11', and section 'I12-I18'.

The processor 140 summates the number of inputs in each section of the event calculation counter and sequentially recognizes the sum as a corresponding digit of the password, and thus, '3', '2', '6', and '7' may correspond to an input of each digit of the password.

According to the embodiment of the present invention, when the user inputs certain number, the user just continuously does input action by the number of same times as that number. Also, a next number can be allowed to be inputted after elapsing for a short time if the user do input action before the input waiting time WT passes. Therefore, there is an advantage in this invention such that it is highly secure and easy to use because the user needs to know it only about the input waiting time WT which is information about a time gap between one digit and another digit of a password for input action.

A password input method according to another embodiment of the present invention guides a user input action in units of steps.

In detail, in a state where a connection is set, the processor 140 initializes the event calculation counter and the digit counter of a password, and then, when an input for increasing the coefficient counter is received through the input unit 110 from a user within predetermined time TV1, the processor 140 increases the event calculation counter to correspond to the input. At this time, the processor 140 may allow the output unit 140 to output an event (flickering of a green LED) which guides the user need to complete the input within time TV1.

For example, when the input unit 110 is configured as a button switch type, an input for increasing the event calculation counter may be the number of inputs received through a button switch within time TV1. In addition, when the input unit 110 is a touch pad type, an input for increasing the event calculation counter may be the number of touches or the number of counting performed based on a touched time. Since the input unit 110 can be provided as various input means, an input for increasing the event calculation counter may be variously set.

Subsequently, when the input for increasing the digit counter is received again, after time TV2 elapses from the stop moment of a user input and increasing the event calculation counter, within predetermined time TV1, the processor 140 increases the event calculation counter to correspond to the input. In this case, time TV2 may be set as the same value of time TV1.

As such a process is repeated and thus the input of a password is completed, the processor 140 compares a pre-saved password with a password based on the value of a calculation counter corresponding to the value of a digit counter to determine whether they are the same.

For example, when it is assumed that time TV1 is three seconds, time TV2 is one second, and the password is '3267', the user presses a button switch three times within three seconds (TV1) so as to input t '3' as the first digit of the password through the input unit 110 while a green LED is flickering, and based thereon, the processor 140 increases a first digit counter of the password by one and increases the event calculation counter to three.

Subsequently, the LED is flickering in red for one second (TV2), and when the time TV2 elapses, the color is changed into green, thereby enabling the user to recognize that the next digit of a password is being received. In this case, the value '3' of the event calculation counter is saved as a first digit of the password on the basis of the digit counter value '1'.

Subsequently, the user presses the button switch twice within three seconds (TV1) so as to input '2' of the second digit of the password through the input unit 10, and based thereon, the processor 140 increases the digit counter by one and increases the event calculation counter to two. Subsequently, when the time TV1 elapses, the value '2' of the event calculation counter is saved as the second digit of the password on the basis of a digit counter value '2'. By repeating this process, it is possible to input and determine a password.

As another example, in an embodiment of the present invention, a password input may be received by using only time TV1 without separately setting both of the above-described time TV1 and time TV2.

In FIG. 4, the processor 140 may recognize that the input for increasing an event calculation counter by one is the input event during time TV1, and when time TV1 elapses, the processor 140 may increase a digit counter by one.

Therefore, when the input for increasing an event calculation counter within time TV1 is received through the input unit 110 from a user, the processor 140 increases the event calculation counter by one, and at this time, after increasing the event calculation counter by one, the processor 140 initializes a timer and waits again for an input for increasing the event calculation counter within time TV1.

That is, when the user tries to input '3' as the first digit of a password (P1), the user performs input action as In1 and then allows the next input as In2 before time TV1 elapses. Therefore, the user performs total three inputs like In1 In2 and In3. Subsequently, after time TV1(T1) elapses, the digit counter increases, and thus, the input subsequent thereto is recognized as the input corresponding to the second digit of a password.

Therefore, when the user tries to input '2' as the second digit of the password (P2), the user performs input action as In4 within time TV1, and in a state where the timer is initialized simultaneously with the input, the user performs a input action as In5 within time TV1 again, and then, allows the time TV2(T2) to elapse.

As described above, the embodiment of the present invention considers not only the number of inputs for increasing the event calculation counter but also time information about when an input is received through a button and another information about whether it exceeds a predetermined time. Therefore, highly secure state may be expected.

Time TV1 may be previously set in factory initialization process, and moreover, may be changed and set by the user.

When such a process is repeated and thus an accurate input is completed for each digit of a password, the processor 140 may change the LED state from a green flickering state to a green light emitting state so as to notify that the password input through the output unit 120 is the same as the pre-saved password, output a changed state, and unlock a secure state.

On the other hand, although inputs for all the digit of a password are completed, if the inputted password is not the same as a pre-saved password, the processor 140 maintains the green flickering state.

In this case, since the user should again input a password from the first, when the user continuously inputs the password for a predetermined time TV3 (for example, larger than three seconds), the processor 140 may initialize an event calculation counter and a digit counter of a password, and in order to notify that the user should again input a password, the processor 140 may control the LED of the output unit 120 to show, for example, a green flickering state after outputting madder light.

When it is determined that there is an event that the number of erroneous trials is equal to a predetermined number in a password input process, the processor 140 may perform unlocking secure state only when the authentication of a master password succeeds.

For example, in the case where the maximum number of input trials of a password is five, when it is determined by the processor 140 that a password which is inputted differs from a pre-saved password four times, the processor 140 control the LED of the output unit 120 to do the flickering operation on madder, so as to notify that there is only one opportunity left to input the password.

In this state, there is no problem if a password is accurately inputted, but if the password is erroneously inputted for five times, the processor 140 may reinforce secure state so that only a master password can unlock the secure state based on a predetermined option.

Since the output unit 120 according to the embodiment of the present invention is configured to output various display colors, the output unit 120 may output, through different display methods, a connection state with a user device, TV1 which is a time at which a password is received, TV2 for preparing for the input of the next digit of the password, an available state which is provided as a password input succeeds and thus user authentication is completed, and a state where an error occurs in the password input a plurality of times.

The password input system 100 according to the embodiment of the present invention may be set to change a password which is set to a default value in a factory shipment, to a password desired by the user.

For example, as the connection with a user device is set, when the input for starting to set a password corresponding to a specific pattern is received through the input unit 110 from the user in a green flickering state of the LED of the output unit 120, the processor 140 control the LED state of the output unit 120 to the green flickering state to a madder flickering state.

Moreover, similarly to the above-described password input method, the processor 140 initializes an event calculation counter and a digit counter of a password, and then, when the input for increasing the event calculation counter is received through the input unit 110 from the user, the processor 140 increases the event calculation counter to correspond to the input. In the case where one digit is input, if the input for increasing the event calculation t counter is received again after a waiting time elapses, the processor 140 increases the event calculation to correspond to the input, and at this time, increases the digit counter together.

In this case, whenever one digit is input, the output unit 120 may allow the LED to flicker in red at a waiting time, and then, may control the LED to flicker in madder again.

In a password, for example, the input for setting may be completed only when all inputs satisfying a predetermined digit number like four digits are received, and when an input having a specific pattern or an input for increasing an event calculation counter after a waiting time elapses or for another waiting time is not received, a setting may be completed.

When such a setting is completed, the processor 140 replaces a pre-saved password with the password input based on an event calculation counter corresponding to each digit of the password to save the input password as a new password and control the LED state to a green light emitting state which shows a connected state.

The processor 140 may use a password as an encryption key, for higher secure state, or may generate an extended encryption key based on the password to encrypt or decrypt the data saved.

Hereinafter, in the password input system 100 according to an embodiment of the present invention, the case where the output unit 120 additionally includes a display such as an LCD will be described below in detail.

The output unit 120 of the password input system 100 according to an embodiment of the present invention may further include a display for outputting one or more letters or images. In this case, if a size of the password input system 100 is very small like a USB for example, the password input system 100 may be designed and manufactured in order for the LED to be implemented in a display such as an LCD together, but is not limited thereto.

Moreover, the display may be implemented to display only one letter like 7-segment display, or may be implemented in the form of a plurality of letters or images.

Figure 5:
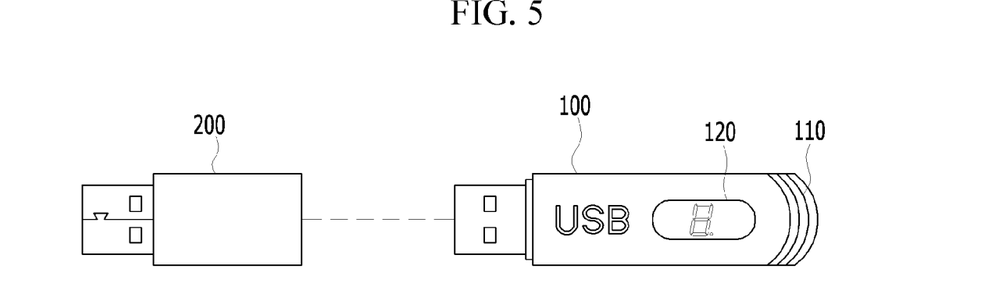
FIG. 5 is the diagram for describing an embodiment in a case where a display is provided.

FIG. 5 is a diagram for describing the embodiment where a display is provided.

First, the case where a display is an element for outputting a one-digit number or letter will be described with reference to FIG. 5 as a first example embodiment.

When a green light emitting state is displayed as a connection with a user device is set, a display of a display unit shows fixed value '0'. Subsequently, in the case where the user should input '942018' as a password, when a button switch is pressed, for example, when the button switch is pressed nine times, the display outputs a letter or an image to correspond to '9'.

When the input for designating a letter or an image outputted as the first digit from the user is received (for example, a button is pressed for a long time), the processor 140 outputs a signal (for example, a letter or an image flickers, and an LED flickers in red and then is changed to a green flickering state) for checking that a setting of the first digit is completed. Subsequently, the processor 140 controls the display to show fixed value '0' again and perform display, thereby preparing output of the letter or the image for designating the second digit of a password.

Subsequently, when the user presses the button switch four times, the display outputs the letter or the image correspond to '4', and when the input for designating a second digit is received through the same method, the signal for checking that a setting is completed is output.

As an input is completed through the above method, the processor 140 compares a pre-saved password with the letter or the image corresponding to each digit of a designated password to determine whether they are the same. Also, when the pre-saved password is the same as the designated password, the processor 140 may change the LED state from a green light emitting state to an OFF state, and when the pre-saved password is not the same as the designated password, the processor 140 may allow the above-mentioned state to be output.

A setting for changing a pre-saved password is similar to the above-described method.

For example, in the state where the LED of the output unit 120 emits green light as a connection with a user device is set, when the input for starting to set a password corresponding to a specific pattern of the button switch is received through the input unit 110 from the user, the processor 140 controls the LED state of the output unit 120 to be changed from a green light emitting state to a madder flickering state.

When the user inputs the value of each digit amid checking the display, and after that, if the user presses the button switch for more than three seconds or the predetermined waiting time elapses, the LED momentarily emits green light and then flickers in madder again.

When a password is set and saved through such a method, the LED which is flickering in madder is changed to a green light emitting state and output.

In this process, immediately before the password is finally set, when inputs corresponding to all digit are completed, the processor 140 may show a password, corresponding to all digit value inputted through the display, at one-second interval, and thus, may provide the user with additional checking step before the password is finally set.

Next, like the first example embodiment, as in FIG. 4, the case where the display is assumed to be configured to output only one-digit number or a letter will be described as the second example embodiment. In this case, the password which should be inputted by the user is assumed as '942018'.

When a green light emitting state is displayed as the connection with a user device is set, the display of the display unit continuously shows letters or images corresponding to a predetermined order. For example, instead of showing fixed value '0' as in the first example embodiment, the display of the display unit sequentially increases the value from '0' to '9' at one-second interval. In this case, images or letters such as alphabet may be continuously displayed in a predetermined order.

When the input for designating a currently outputted letter or image as the first digit of a password is received from the user, the processor 140 designates the currently outputted letter or image as the first digit of a password, and then, continuously outputs letters or images in a predetermined order and waits for receiving the input which designates the second digit of the password.

For example, as the number displayed by the display increases from '0 and reaches to '9', when the user presses a button for designating currently-outputted '9' as the first digit, the processor 140 controls the display to show '0' again, and controls the LED to flicker in green after emitting green light.

Subsequently, when the number increases from '0 and reaches to '4' corresponding to the next digit of the password, the user presses a button for designating currently-outputted '4' as the second digit, and thus, the processor 140 controls the display to show '0' again.

As the input of the password is completed through such a process, the processor 140 compares a pre-saved password with a letter or an image corresponding to each digit of the inputted password to determine whether they are the same.

In this case, when the pre-saved password is the same as the inputted password, the processor 140 may control the LED state to be changed from a green flickering state to a normal green light emitting state, and when the pre-saved password is not the same as the inputted password, the processor 140 may output the above-described state.

A setting for changing a pre-saved password in the second example embodiment is similar to the password input step.

For example, in the state where the LED of the output unit 120 emits green light as a connection with a user device is set, when the input for starting to set a password corresponding to the specific pattern of the button switch is received through the input unit 110 from the user, the processor 140 controls the LED state of the output unit 120 a green light emitting state to a madder flickering state.

The user checks that letters or images which are continuously outputted in a predetermined order on the display, and when a letter or an image to input is displayed on the display, the user designates the corresponding letter or image as the first digit through the input unit 110. At this time, in order to notify that the first digit is designated, the processor 140 may control the corresponding letter or image to flicker or may control the LED to flicker in madder after flickering in red.

After the first digit is inputted, letters or images are displayed on the display in a predetermined order again, and the password is set for all of its digit through the above-described method.

When all digit of a password are designated and the button input having a specific pattern is received or a predetermined time elapses, the LED state may be changed from a madder flickering state to a normal green light emitting state, and thus, the user may check that a change setting of the password is completed.

In this process, immediately before the password is finally set, when inputs corresponding to all digit value are completed, the processor 140 may show a password, corresponding to all digit value inputted through the display, at one-second interval, and thus, may provide the uses with additional checking step before the password is finally set.

Figure 6:
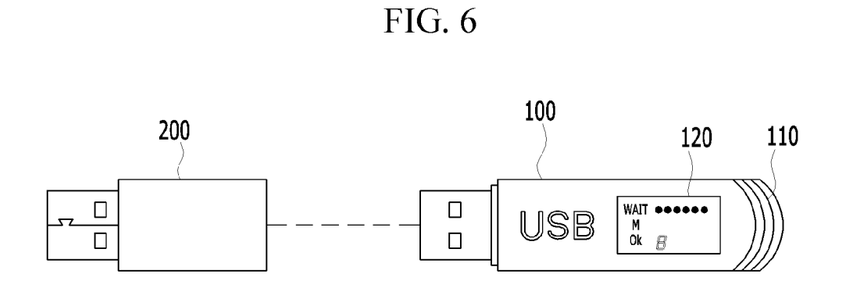
FIG. 6 is the diagram for describing another embodiment in a case where a display is provided.

FIG. 6 is a diagram for describing another embodiment in the case where a display is provided.

In a third example embodiment illustrated in FIG. 5, unlike the first and second example embodiments, the case where a display is assumed to be in a state which is configured to output a plurality of letters or images will be described. In this case, the password which should be inputted by the user is assumed as '942018'.

When a green light emitting state is displayed as the connection with a user device is set, the display of the display unit may show each digit of a designated password as a blind letter or image.

In a password input waiting state, the first digit of a blind letter or image of a password is displayed as flickering. In this state, as in the second example embodiment, letters or images corresponding to a predetermined order are continuously displayed on a certain region of the display, and after the user designates a currently outputted letter or image as a first digit, the blind letter or image corresponding to the second digit of the next password is displayed as flickering.

After the input of a password is completed through the above-described method, the mark 'OK' indicating that the inputted password is the same as the password saved is displayed on a certain region of the display.

When the input for designating a letter or an image corresponding to each digit of a password as each digit is received, in order to provide a more accurate input by allowing a user to check the inputted password, the letter or image inputted to a corresponding digit of a blind letter is temporarily outputted, and then, a blind letter or image corresponding to a next digit may be output to flicker.

In a password setting process, when the input for starting to set a password corresponding to a specific pattern of a button switch is received through the input unit 110 from the user, the processor 140 controls the display of the output unit 120 to display a mark M notifying that a password is being currently set.

Subsequently, the user checks that letters or images continuously outputted in a predetermined order on the display, and if the letter or image to be inputted is showed on the display, the user designates that letter or image as the first digit through the input unit 110.

At this time, similarly to a password inputting process, the first digit of a blind letter or image of a password which should be currently inputted is displayed as flickering, and the other is displayed as blind letter.

Moreover, when the input of a corresponding digit is completed, the letter or image inputted to a corresponding digit of a blind letter is temporarily output, and then, a blind letter or image of a next digit may be displayed as flickering.

When all inputs for setting a password are completed or in a process of waiting an input of a next digit after an input of each digit is completed, the letter or image of the inputted password may be sequentially shown, for example, at one-second interval, and thus, the user may check whether a currently or finally inputted password is normally inputted or not.

In FIGS. 5 and 6, the connection with the password adaptor 200 may be set, and in this case, the user may unlock the secure state even without inputting the password as described above.

According to one of the technical solutions of the present invention described above, by using a password adaptor, a user can unlock the secure state without inputting a password in a safe environment where only the authentic user uses a device, thereby enhancing the convenience of use.

Moreover, even without an extra program or application being installed in a computer, the password input system can achieve high-level security.

Further, since only one switch is used as an input unit, the password input system can be simply equipped in a small-sized device (for example, an USB type auxiliary storage device, etc.) and it can be put to practical use at lowest cost. Thus, there is advantage that it is possible to actually apply the password input system to a variety of products requiring a security measure like a door lock system.

For reference, the elements according to the embodiment of the present invention illustrated in FIG. 1 may be implemented as software or a hardware type such as field programmable gate array (FPGA) or application specific integrated circuit (ASIC) and may perform certain functions.

However, "elements" are not meanings limited to software or hardware, and each element may be configured to reside in an addressable storage medium and configured to execute on one or more processors.

Thus, an element may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

The functionality provided for in the components and modules may be combined into fewer components and modules or further separated into additional components and modules.

According to the embodiment of the present invention described above, even without extra program or application being installed in a computer, highly secure state may be implemented based on the password input system 100 at low cost.

The method and system according to the embodiments of the present invention have been described in association with a specific embodiment, but their elements, some operations, or all operations may be implemented by using a computer system having general-use hardware architecture.

The foregoing description of the present invention is for illustrative purposes, those with ordinary skill in the technical field of the present invention pertains in other specific forms without changing the technical idea or essential features of the present invention that may be modified to be able to understand. Therefore, the embodiments described above, exemplary in all respects and must understand that it is not limited. For example, each component may be distributed and carried out has been described as a monolithic and describes the components that are to be equally distributed in combined form, may be carried out.

The scope of the present invention is defined by the below-described claim rather than the detailed description, and it should be construed that all changes or modified forms obtained from the meaning and scope of the claim and an equivalent concept thereof are within the scope of the present invention.

The invention claimed is:

1. A system for unlocking a secure state, the system comprising:
    a password input system equipped with a security setting function; and
    a password adaptor detachably coupled to the password input system, wherein the password input system comprises:
        one input unit configured to receive a password input sequentially performed by a user;
        an output unit configured to output a current state of the password input and a result of processing of the password;
        a dedicated communication port configured to transmit and receive data to and from the password adaptor;
        a memory configured to save a program for the security setting function; and
        a processor configured to execute the program saved in the memory,
    wherein the password input received through the one input comprises information about a number of inputs, information about an input time, information about a time interval between inputs, and information about an input waiting, and
    wherein, when the password adaptor is coupled to the dedicated communication port, the processor receives a password through communication with the password adaptor and compares the received password with a pre-saved password, and when the received password matches the pre-saved password, the processor unlocks a secure state without a password being input from the one input unit; and when the password input is received through the one input unit from the user, the processor counts the information about a number of inputs by using an event calculation counter, recognizes the password input using the information about a number of inputs, the information about an input time, the information about a time interval between inputs, and the information about an input waiting, and compares the recognized password input with the pre-saved password, and when the recognized password input matches the pre-saved password, the processor unlocks the secure state,
    wherein
    the processor initializes an input table and an event calculation counter saved in the memory, increases the event calculation counter on the basis of the number of inputs received through the input unit from the user, and records a time interval between successive inputs in the input table by using the event calculation counter as a pointer,
    as an input waiting time elapses, the processor determine that an input of the password is completed,
    the processor selects pieces of time interval information saved in the input table from largest where a number of selected pieces of time interval information is one less than a number of digit of a password, uses a selected piece of time interval information as a separation point of each digit of the password, and divides the event calculation counter into multiple sections on the basis of separation points, and
    the processor summates the number of inputs in each section of the event calculation counter divided by the separation points, thereby sequentially recognizing the sum as an input of each digit of the password.

2. The system of claim 1, wherein, when information about the password received from the password adaptor does not match the pre-saved password, the processor accumulates number of mismatches and saves the accumulated number of mismatches in the memory, and when the accumulated number of mismatches is greater than a predetermined number, the processor performs a state change so that the secure state is unlocked based on only an input received through the one input unit.

3. The system of claim 2, wherein, in a state where the state change is performed so that the secure state is unlocked based on only the input received through the one input unit, when the secure state is unlocked based on a password input by the user, the processor initializes the accumulated number of mismatches.

4. The system of claim 1, wherein the dedicated communication port is a universal serial bus (USB) port and the password adaptor is implemented as a USB device including a USB port, or the dedicated communication port is a radio frequency identification (RFID) reader unit and the password adaptor is implemented as an RFID tag.

5. The system of claim 1, wherein the password adaptor comprises a plurality of serially connected shift registers, sets a value of the password to an input value of each of the plurality of serially connected shift registers, and transfers a value, output based on a shift clock signal applied thereto, through the dedicated communication port.

6. The system of claim 5, further comprising:
    an input register configured to receive and read the output value; and
    an output register configured to generate the shift clock signal and a load signal for inputting the input value to a corresponding shift register.

7. The system of claim 5, wherein, when all values received through the dedicated communication port are 0 or 1, the processor determines that a connection to the password adaptor is not set.

8. The system of claim 1, wherein the output unit outputs an event notifying the user of a password input request.

9. A system for unlocking a secure state, the system comprising:
    a password input system equipped with a security setting function; and
    a password adaptor detachably coupled to the password input system, wherein the password input system comprises:
        one input unit configured to receive a password input of a user;
        an output unit configured to output a current state of the password input and a result of processing of the password;
        a dedicated communication port configured to transmit and receive data to and from the password adaptor;
        a memory configured to save a program for the security setting function; and
        a processor configured to execute the program saved in the memory,
    wherein the password input comprises one or more of information about a number of inputs received through the input unit, information about an input time, information about a time interval between inputs, and information about an input waiting, and
    wherein, when the password adaptor is coupled to the dedicated communication port, the processor receives a password through communication with the password adaptor and compares the received password with a pre-saved password, and when the received password matches the pre-saved password, the processor unlocks a secure state without a password being input from the input unit; and when the password input is received through the one input unit from the user, the processor compares the password input with the pre-saved password, and when the password input matches the pre-saved password, the processor unlocks the secure state, wherein the processor initializes an event calculation counter and a digit counter of a password, and when the input for increasing the event calculation counter is received through the one input unit from the user within a predetermined time TV1 (Time Value No. 1), the processor increases the event calculation counter to correspond to the input, when an input for increasing the event calculation counter is received again within the predetermined time TV1 after a predetermined time TV2 (Time Value No. 2) elapses, the processor increases the event calculation counter to correspond to the input and may increase the digit counter together, and as the input is completed, the processor compares the pre-saved password with a password input based on the event calculation counter corresponding to each digit counter of the password to determine whether they are the same.

10. A system for unlocking a secure state, the system comprising:
   a password input system equipped with a security setting function; and
   a password adaptor detachably coupled to the password input system, wherein the password input system comprises:
   one input unit configured to receive a password input of a user;
   an output unit configured to output a current state of the password input and a result of processing of the password;
   a dedicated communication port configured to transmit and receive data to and from the password adaptor;
   a memory configured to save a program for the security setting function; and
   a processor configured to execute the program saved in the memory,
   wherein the password input comprises one or more of information about a number of inputs received through the input unit, information about an input time, information about a time interval between inputs, and information about an input waiting, and
   wherein, when the password adaptor is coupled to the dedicated communication port, the processor receives a password through communication with the password adaptor and compares the received password with a pre-saved password, and when the received password matches the pre-saved password, the processor unlocks a secure state without a password being input from the input unit; and when the password input is received through the one input unit from the user, the processor compares the password input with the pre-saved password, and when the password input matches the pre-saved password, the processor unlocks the secure state, wherein the processor initializes an event calculation counter and a digit counter of a password, and when an input for increasing the event calculation counter is received through the one input unit from the user within a predetermined time TV1, the processor increases the event calculation counter, initializes a timer, and waits for an input for increasing the event calculation counter within a next TV1, when TV1 elapses, the processor increases the digit counter and recognizes the event calculation counter, increased until before time TV1 elapses, as an input of a password of a digit before the digit counter increases, and as the input is completed, the processor compares the pre-saved password with a password input based on the event calculation counter corresponding to each digit counter of the password to determine whether they are the same.

11. The system of claim 1, wherein, when an input for starting to set a password is received through the one input unit from the user, the processor replaces the pre-saved password with an inputted password, based on the same method as receiving the input of the password.

12. The system of claim 1, wherein
   the output unit comprises a display for outputting one or more letters or images,
   the display displays a letter or an image corresponding to the number of inputs received through the one input unit, and when an input for designating the output letter or image as a first digit of a password is received from the user, the processor outputs, through the display, a letter or an image for designating a second digit of the password, and
   as the input is completed, the processor compares the pre-saved password with a letter or an image corresponding to each digit of the designated password to determine whether they are the same.

13. The system of claim 1, wherein
   the output unit comprises a display for outputting one or more letters or images,
   the display continuously outputs letters or images corresponding to a predetermined order, and when an input for designating a currently output letter or image as a first digit of a password is received from the user, the processor designates the currently output letter or image as the first digit of a password, and then, continuously outputs the letters or the images in the predetermined order and waits for receiving an input which designates a second digit of the password, and
   as the input is completed, the processor compares the pre-saved password with a letter or an image corresponding to each digit of the designated password to determine whether they are the same.

* * * * *